(12) United States Patent
Kung et al.

(10) Patent No.: US 6,636,910 B2
(45) Date of Patent: Oct. 21, 2003

(54) PERIPHERAL DEVICE OF A PORTABLE COMPUTER WITH THERMAL CONTROL CIRCUITRY

(75) Inventors: Shao-Tsu Kung, Taipei (TW); Jenq-Haur Pan, Taipei (TW)

(73) Assignee: Compal Electronics, Inc., Taipei (TW)

( * ) Notice: Subject to any disclaimer, the term of this patent is extended or adjusted under 35 U.S.C. 154(b) by 46 days.

(21) Appl. No.: 09/683,134

(22) Filed: Nov. 25, 2001

(65) Prior Publication Data

US 2002/0194402 A1 Dec. 19, 2002

(30) Foreign Application Priority Data

Jun. 15, 2001 (TW) .......................... 90114512 A

(51) Int. Cl.[7] .............................. G06F 1/08; G06F 3/00
(52) U.S. Cl. ......................... 710/60; 710/48; 713/501
(58) Field of Search .......................... 710/48, 36, 58, 710/60; 713/322–324, 600, 501; 361/103, 93.2, 93.8; 700/46; 714/47; 340/825.71, 825.73; 702/132

(56) References Cited

U.S. PATENT DOCUMENTS

| | | | | |
|---|---|---|---|---|
| 5,490,059 A | * | 2/1996 | Mahalingaiah et al. | ....... 700/46 |
| 5,745,375 A | * | 4/1998 | Reinhardt et al. | .......... 700/286 |
| 6,192,479 B1 | * | 2/2001 | Ko | .............................. 713/300 |
| 6,397,343 B1 | * | 5/2002 | Williams et al. | ............ 713/501 |

* cited by examiner

Primary Examiner—Kim Huynh
(74) Attorney, Agent, or Firm—Winston Hsu

(57) ABSTRACT

A peripheral device with thermal control circuitry is set within a casing of a portable computer. The peripheral device includes at least a peripheral processor set for providing specific operations, and pulse circuitry electrically connected to the peripheral processor for producing pulse signals with a predetermined first frequency and transmitting to the peripheral processor. The pulses are used so that the peripheral processor can operate according to a predetermined first operation velocity. The peripheral device also includes thermal control circuitry with a thermal sensor. When a temperature detected by the thermal sensor exceeds a first predetermined temperature, the thermal control circuitry produces a first output to the pulse circuitry so as to reduce the frequency of the pulse signals to a predetermined second frequency. This reduces the operating velocity of the peripheral processor to a second operating velocity.

4 Claims, 2 Drawing Sheets

PERIPHERAL DEVICE OF A PORTABLE COMPUTER WITH THERMAL CONTROL CIRCUITRY

BACKGROUND OF INVENTION

1. Field of the Invention

The present invention relates to a peripheral device of a portable computer, and more particularly to a peripheral device of a portable computer with thermal control circuitry.

2. Description of the Prior Art

With the quick development of information technology, computer systems widely used in every industry are playing an important role in many companies for modernization. The manufacturing of portable computers has become a mainstream business in the computer industry because of the increase of data storage density, the improvement of operational speed, and the decrease of production cost.

When designing portable computers, the problem of expelling heat is one of the most important factors to consider. In general, the source of heat mostly comes from the central processing unit (CPU). Therefore, heat dissipation systems in portable computers are mainly designed to expel the heat generated from the CPU. Along with the improvements of the system performance brought by increasing the operational speed of the CPU, the temperature of PC components and the computer system also increase. A poorly designed heat dissipation system may make the system unstable for high temperatures. It may hurt users due to the overheated system and PC components. Unfortunately, the phenomenon is not likely to be observed by users while using computers. When the temperature reaches the maximum tolerable level, the system will become unstable.

SUMMARY OF INVENTION

A peripheral device with thermal control circuitry is set within a casing of a portable computer. The portable computer further includes a main memory for storing programs and data, a central processing unit (CPU) for executing programs stored in the main memory, and a bus for connecting the peripheral device and the CPU. The peripheral device includes an outer package for protecting inner components of the peripheral device, and at least a peripheral processor set within the outer package for providing a specific operation, control, or driving functions. The peripheral device further includes pulse circuitry set within the outer package and electrically connected to the peripheral processor. The pulse circuitry produces pulse signals with a predetermined first frequency and transmits the signals to the peripheral processor, so that the peripheral processor can operate according to a predetermined first operation velocity, and thermal control circuitry set within the outer package with a thermal sensor. When a temperature detected by the thermal sensor of the thermal control circuitry exceeds a first predetermined temperature, the thermal control circuitry produces a first output to the pulse circuitry. This first output reduces the frequency of the pulse signals to a predetermined second frequency, so that the operating velocity of the peripheral processor is reduced to a second operating velocity. Simultaneously, the thermal control circuitry produces an interrupt signal to interrupt operation of the CPU. The CPU then performs a corresponding interrupt processing program to deal with related actions after the peripheral processor is reduced to the second operating velocity.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
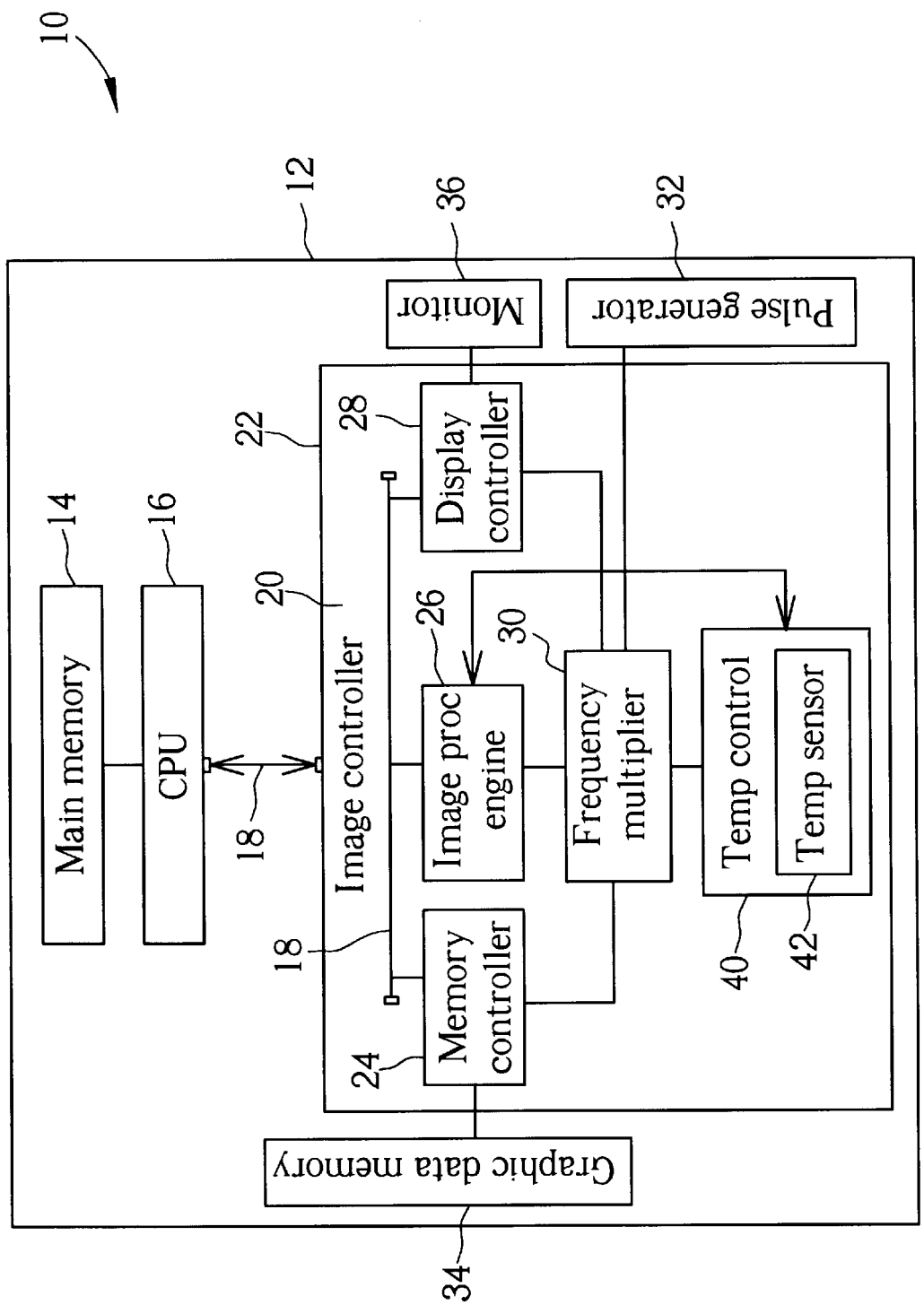
FIG. 1 is a block diagram of the first embodiment of a portable computer according to the present invention.

Please refer to FIG. 1, which is a block diagram of the first embodiment of a portable computer 10 according to the present invention. As shown in FIG. 1, the portable computer 10 comprises a main memory 14 for storing programs and data, a central processing unit (CPU) 16 for executing programs stored in the main memory 14, a peripheral device 20 installed inside a housing 12 of a portable computer 10, and a bus 18 for connecting the peripheral device 20 and the CPU 16.

In the present embodiment, the peripheral device 20 is an image controller 20 comprising an external housing 22 for protecting internal components of the image controller 20, a memory controller 24 electronically connected between an external graphic data memory 34 and the bus 18 for controlling reading and writing of graphic data in the graphic data memory 34, a display controller 28 for controlling image displays of an external monitor, and an image processing engine 26 for processing graphic data in the graphic data memory 34 and transmitting the graphic data to the display controller 28. The peripheral device 20 also includes a frequency multiplier 30, electronically connected to the memory controller 24 and the image processing engine 26, for generating the first predetermined frequency of pulses, and for transmitting the pulses to the memory controller 24 and the image processing controller 20 operated according to the first predetermined speed. The peripheral device 20 also includes temperature control circuitry 40 installed inside the housing 22 having a temperature sensor 42 for detecting the surrounding temperature of the image controller 20. Furthermore, the frequency multiplier 30, which is electronically connected to an external pulse generator 32, changes the frequency of pulses transmitted from the external pulse generator 32.

When the temperature detected by the temperature sensor 42 of the temperature controlled circuitry 40 exceeds a predetermined level, the temperature controlled circuitry 40 generates the first request to the frequency multiplier 30. Then, the frequency multiplier 30 reduces the frequency of pulses generated by the external pulse generator 32 to the second predetermined frequency so as to reduce the speed of both the memory controller 24 and the image processing engine 26 to the second predetermined speed. Meanwhile, the temperature controlled circuitry 40 transmits the first request to the image processing engine 26 for adjusting the image processing engine 26 to the second predetermined speed, according to the pulse signal generated by the frequency multiplier 30. Simultaneously, the temperature controlled circuitry 40 generates an interrupt signal to interrupt the operation of the CPU 16, and the CPU 16 executes a corresponding interrupt processing program. This program handles the operation of the memory controller 24, the image processing engine 26, and the display controller 28 after decreasing the operation speed.

When the temperature detected by the temperature sensor 42 of the temperature controlled circuitry 40 is lower than the first predetermined temperature, it means that the CPU 16, the memory controller 24, the image processing engine 26, and the display controller 28 operate too slowly. Therefore, it is necessary to increase the operational speed for achieving the maximum performance. The temperature controlled circuitry 40 generates the second request to the frequency multiplier 30 for increasing the frequency generated by the frequency multiplier 30 to the first predetermined frequency. Then the memory controller 24, the image processing engine 26, and the display controller 28 operate at the first predetermined speed. Using the temperature sensor 42 of the temperature controlled circuitry 40 to adjust the frequency of pulse signals generated from the frequency multiplier 30 thereby maintains the stability of internal components and the whole system.

Figure 2:
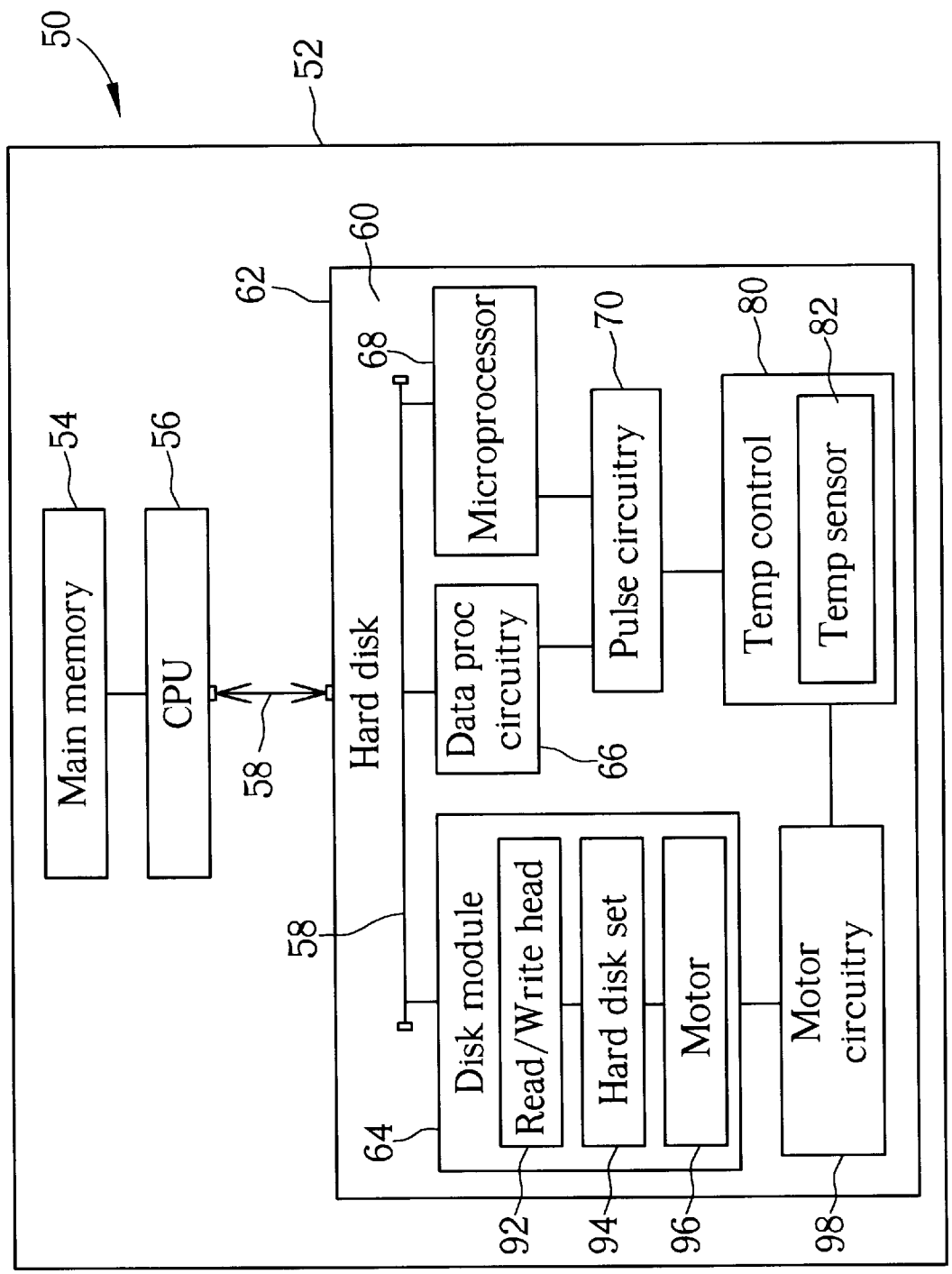
FIG. 2 is a block diagram of the second embodiment of a portable computer according to the present invention.

Please refer to FIG. 2, which is a block diagram of the second embodiment of a portable computer according to the present invention. As shown in FIG. 2, the portable computer 50 comprises a main memory 54 for storing programs and data, a central processing unit (CPU) 56 for executing programs stored in the main memory 54, a peripheral device 60 installed inside a housing 52 of a portable computer 50, and a bus 58 for connecting the peripheral device 60 and the CPU 56.

In the present embodiment, the peripheral device 60 is a hard disk comprising a housing 62, a disk module 64, data process circuitry 66, a microprocessor 68, motor driving circuitry 98, pulse circuitry 70, and temperature controlled circuitry 80. The housing 62 is used to protect the internal components. The disk module 64 comprises a hard disk set 94 for storing data, a read/write head 92 for writing data into the hard disk set 94 or retrieving data from the hard disk set 94, and a motor 96 for driving the hard disk set 94. The data process circuitry 66 is electronically connected to the read/write head 92 of the disk module 64 and the bus 58 for processing data stored in the disk module 64 or data retrieved from the disk module 64. The microprocessor 68 is used for controlling operations of the hard disk drive 60. The motor driving circuitry 98 is used for controlling the rotations of the motor 96 of the hard disk set 64. The pulse circuitry 70 is electronically connected to the data process circuitry 66 and the microprocessor 68 for controlling the speed of the data process circuitry 66 and the microprocessor 68. The temperature controlled circuitry 80 installed inside the housing 62 comprises a temperature sensor 82 for detecting the temperature of the surroundings when the hard disk 60 is operating.

When the temperature detected by the temperature sensor 82 of the temperature controlled circuitry 80 exceeds the first predetermined level, the temperature-controlled circuitry 80 will generate the first request to the pulse circuitry 70. Then, the pulse circuitry 70 decreases the frequency of pulses generated by the pulse circuitry 70 to the second predetermined frequency so as to reduce the speed of the data process circuitry 66 and the speed of the microprocessor 68 to the second predetermined speed. Meanwhile, the temperature controlled circuitry 80 will generate another request to the motor driving circuitry 98 so that the motor driving circuitry 98 will reduce the rotational speed of the motor 96 of the hard disk module 64.

When the temperature detected by the temperature sensor 82 of the temperature controlled circuitry 80 is lower than the first predetermined temperature, it means that the CPU 56, the hard disk module 64, the data process circuitry 66, and the microprocessor 68 operate too slowly. Therefore, it is necessary to increase the operational speed for achieving maximum performance. The temperature controlled circuitry 40 generates a second request to the pulse circuitry 70 for increasing the frequency generated by the pulse circuitry 70 to the first predetermined frequency. Then the hard disk module 64, the data process circuitry 66, and the microprocessor 68 operate at the first predetermined speed. Using the temperature sensor 82 of the temperature controlled circuitry 80 to detect the surrounding temperature of the hard disk 60 for adjusting the frequency of pulses generated from the pulse circuitry 70 thereby maintains the stability of internal components of external devices and the whole system.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A hard disc drive installed inside a housing of a portable computer, the portable computer comprising a main memory for storing programs and data, a central processing unit for executing programs stored in the main memory, and a bus for connecting the peripheral device and the central processing unit, the hard disc drive comprising:

a housing for protecting elements inside the hard disc drive;

a disc module installed inside the housing and having a hard disc set for storing data, a read/write head for writing data into the hard disc set or retrieving data from the hard disc set, and a motor for driving the hard dime set;

data process circuitry installed inside the housing and electrically connected to the read/write head of the disc module and the bus for processing data stored in the disc module or data retrieved from the disc module;

a microprocessor installed inside the housing for controlling operations of the hard disc drive;

pulse circuitry installed inside the housing and electrically connected to the the data process circuitry and the microprocessor for controlling the speed of the data process circuitry and the speed of the microprocessor; and temperature controlled circuitry installed inside the housing having a temperature sensor;

wherein when a temperature detected by the temperature sensor exceeds a first predetermined level, the temperature controlled circuitry will generate a first request to the pulse circuitry to reduce a frequency of pulses generated by the pulse circuitry from a first frequency to a second frequency so as to reduce a speed of the data process circuitry and the speed of the microprocessor from a first speed to a second speed.

2. The hard disc drive of claim 1 wherein when the temperature detected by the temperature sensor exceeds the first predetermined level, the temperature controlled circuitry will generate an interrupt signal to interrupt operations of the central processing unit and execute a corresponding interrupt program to process operations relevant to a reduction of the speed of the data process circuitry and the speed of the microprocessor.

3. The hard disc drive of claim 1 further comprising motor driving circuitry for controlling rotations of the motor; wherein when the temperature detected by the temperature sensor exceeds the first predetermined level, the temperature controlled circuitry will generate another request to the motor driving circuitry so that the motor driving circuitry will reduce a rotational speed of the motor.

4. The hard disc drive of claim 1 wherein when the temperature detected by the temperature sensor is below a second predetermined level, the temperature controlled circuitry will generate a second request to the pulse circuitry to increase the frequency of pulses generated by the pulse circuitry to the first frequency so as to bring the speed of the data process circuitry and the speed of the microprocessor back to the first speed.

* * * * *